Aug. 7, 1945.   R. M. GREENLEAF ET AL   2,381,276
WHEEL GAUGING INSTRUMENT
Filed March 20, 1944   3 Sheets-Sheet 3
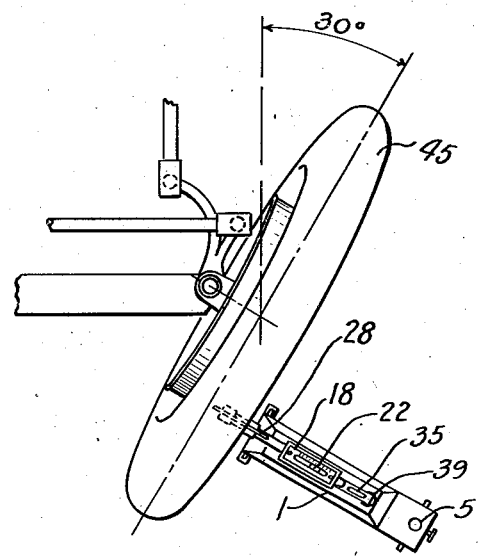
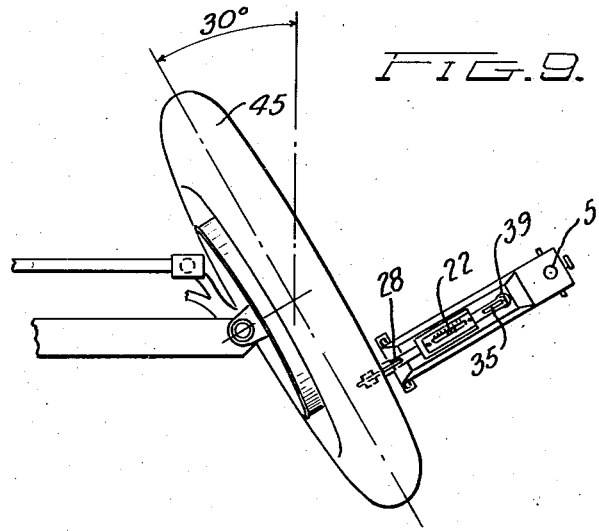
INVENTORS
Robert M. Greenleaf
& John L. Hunt
BY
Barnes, Kisselle, Laughlin & Kisch
Attorneys Patented Aug. 7, 1945

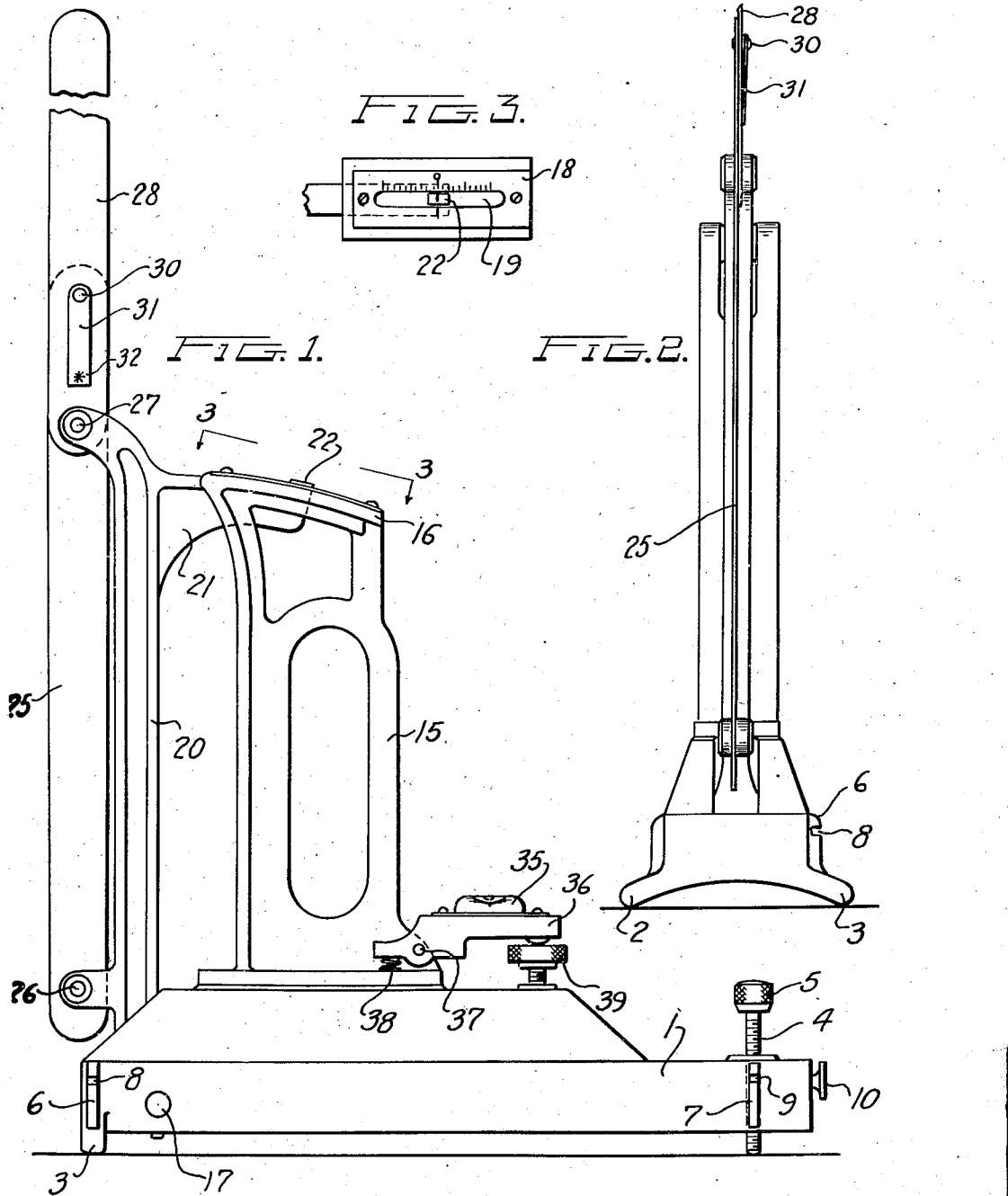

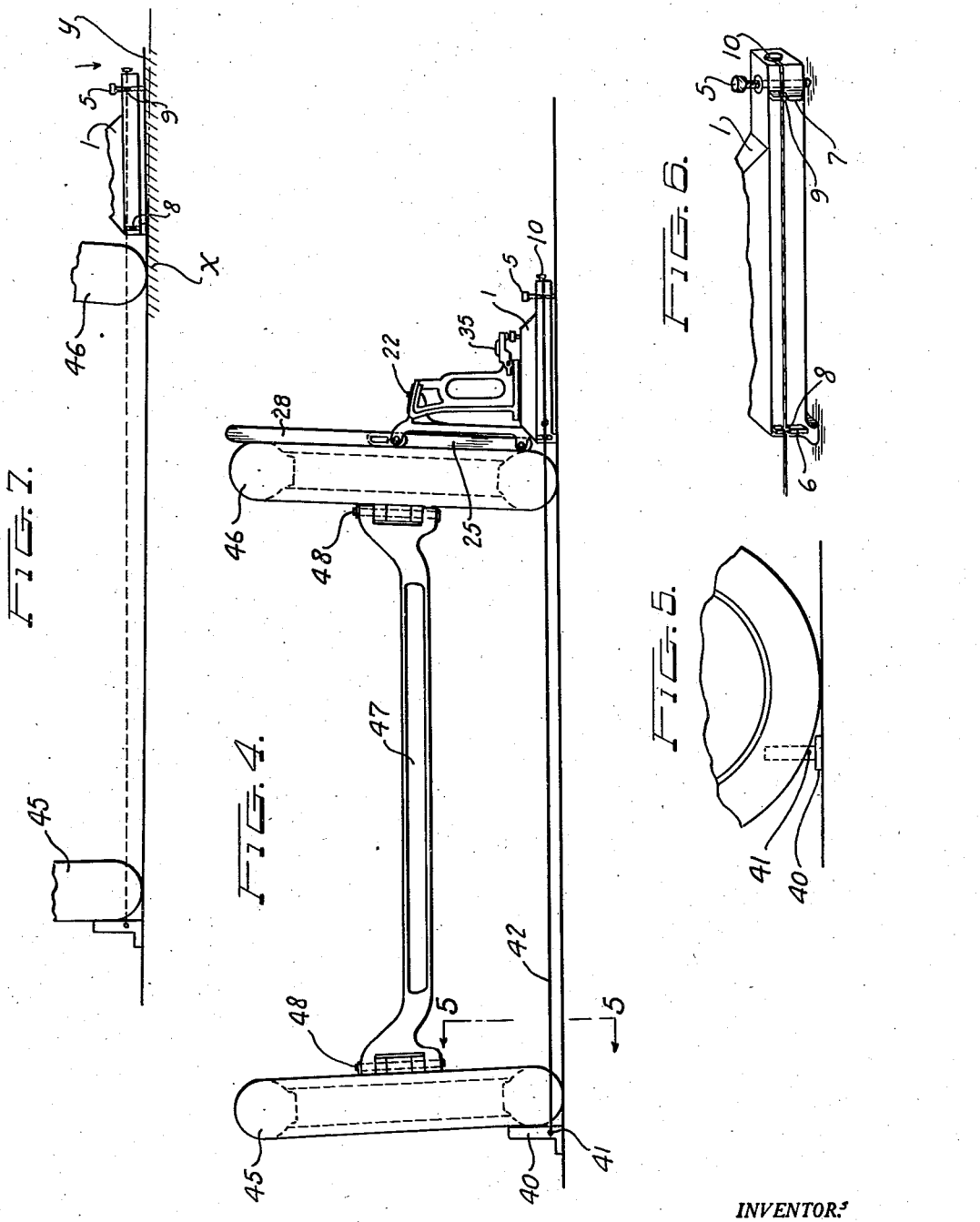

2,381,276

UNITED STATES PATENT OFFICE 2,381,276

WHEEL GAUGING INSTRUMENT

Robert M. Greenleaf and John L. Hunt, Grosse Pointe, Mich., assignors to M. L. Trust, F. R. Pendleton, trustee Application March 20, 1944, Serial No. 527,194

9 Claims. (Cl. 33—203)

This invention relates to the matter of gauging or checking the mounting and adjustment of vehicle wheels, and it has to do particularly with the dirigible wheels of an automotive vehicle. These dirigible wheels are commonly the front wheels although in multi-wheeled vehicles some of the wheels other than the front wheels may be dirigible.

The front wheels of the conventional automotive vehicle, in order to provide for correct wheel-roll and correct wheel function, are usually disposed at an angle to the vehicle and this is commonly called the camber of the wheel. The king pin upon which the wheel turns is also usually placed at an angle to the vertical and this is referred to as caster. The amount or degree of camber and caster may vary with different vehicles and vehicles of different manufacture, but the wheel should be maintained in the specified position for correct wheel function, steering action and for the very important purpose of eliminating excess tire wear. In some cases the caster of the king pin may be reversed so that the king pin leans forwardly of the vehicle instead of rearwardly.

The principal object of this invention is to provide an improved instrument useful for checking or gauging both camber or caster. The checking of the camber has been heretofore a rather difficult procedure particularly for the ordinary service institution or garage. When the check is made the weight of the vehicle should be on the wheels, but it is next to impossible to find a floor which is level enough so that accurate readings can be made. The camber is usually only a few degrees or fractions of degrees, and a slight irregularity in the floor which is normally unobservable will render valueless camber readings made while the vehicle is standing upon such a floor. The object of this invention is to provide an improved apparatus for accurately gauging wheel camber even though the vehicle is resting upon a non-level or irregular support or floor. This is accomplished by establishing a plane parallel to a plane connecting the points of elevation where the two opposite wheels rest upon the floor. This plane obviously may not be horizontal. The gauging instrument is then adjusted to bring it into the established plane and having thus placed the instrument in a correct plane relative to the plane in which the wheels rest, accurate camber readings can be made. It is also the purpose of this invention to provide an improved instrument for the gauging of the wheel caster.

One form of device for carrying out the invention is disclosed in the accompanying drawings.

In these drawings:

Fig. 1 is a side elevational view of a gauging instrument constructed in accordance with the invention.

Fig. 2 is an end view of the instrument looking from the left of Fig. 1.

Fig. 3 is a view looking in the direction of the arrows 3—3 of Fig. 1 and showing the scale or dial.

Fig. 4 is a view illustrating how the instrument is employed in gauging the camber of a wheel.

Fig. 5 is a detailed view illustrating the wheel opposite the one being engaged in Fig. 4, and showing what may be termed, a target or anchor.

Fig. 6 is a view of the base of the instrument showing the same in perspective to illustrate how the instrument is brought into the desired plane.

Fig. 7 is a diagrammatical view similar to Fig. 4 showing a non-level floor condition.

Fig. 8 is a view illustrating the first gauging action in checking the caster of the wheel.

Fig. 9 is a view similar to Fig. 8 showing the second gauging action in the checking of the caster.

The gauging instrument comprises a base 1 designed to rest upon the floor advantageously upon three points. There are two supports or floor engaging feet 2 and 3 at one end of the base, while at the opposite end of the base there is a single support in the form of an adjustable member. This member advantageously is a screw 4 threaded into the base and having a head 5 by means of which it may be turned.

On the side of the base are two indicators advantageously in the form of notches or recesses. These are provided by flanges 6 and 7, provided with notches 8 and 9. The purpose of these notches will presently appear and the arrangement is illustrated in Fig. 6. A suitable attaching device or holding device, such as a button 10, is mounted on the body advantageously on the end thereof.

A standard which may be integral with, or separate from the body 1 stands up from the body as shown at 15. The top of the standard as at 16 is curved preferably on an arc around a pin 17 as a center. The top of the standard is slotted as at 19 and it is equipped with a suitable scale or indicia 18.

Swiveled on the pin 17 is a bracket 20 having an arm 21 with an indicating portion 22 for cooperation with the scale and this portion may project into the slot 19. A straight edge is carried by the bracket 20 and it comprises a strip 25 secured to the bracket at 26 and 27, by means of rivets or the like. A second strip 28 is also connected to the bracket as at 27 so that it may be pivoted to and from folded and extended positions relative to the strip 25. A locking pin 30 is mounted on a spring 31 secured to the strip 28 as by means of tack welding or the like at 32, and this pin extends through apertures in the strips to hold the two strips in alignment. This is illustrated in Fig. 2. When the strips are extended they form a straight edge for engagement with a wheel of a vehicle and when the instrument is not in use the strip 28 may be folded into overlapping relationship with the strip 25.

A spirit level 35 is carried by a bracket 36 pivotally connected to the body of the tool at 37 and acted upon by a spring 38. An adjusting screw 39 underlies the bracket on the side of the pivot opposite the spring 38 so that adjustment of the screw varies the angular relationship of the bracket and the level relative to the body of the instrument.

In association with the instrument is a device 40 (Fig. 4) which may be termed a target or an anchor and the target is provided with a pin or other arrangement at 41 for attachment thereto of a suitable length of material such as a cord or line 42. This cord or line is to be secured to the body 1 as by means of wrapping the same around the button 10. The arrangement is that the cord is wedged or squeezed in between the button and the body.

With this arrangement the camber of a wheel may be ascertained even though the vehicle be resting upon a floor which is not level. In this connection it is to be observed that the point 41 is located a distance above a level floor which is the same as the distance of the slot 8 from a level floor. Prefereably when the body 1 rests upon a level floor and is itself level, the slot 9 is the same distance from the floor as the slot 8 as represented in Fig. 1. The manner of use in ascertaining the camber is illustrated in Figs. 4 and 7 wherein one wheel is illustrated at 45 and the other at 46 connected by the usual axle 47 through the usual king pins 48. Fig. 4 shows an axle structure, but it is obvious that independently mounted wheels can be similarly tested and no attempt is made herein to differentiate the wheels proper and the tires thereon.

The floor line of Fig. 4 is shown as being truly level. The anchor 40 is placed in abutting relationship with the outside surface of the wheel 45, and then the tool is positioned so that the straight edge engages the opposite wheel. The cord 42 is then drawn taut and wrapped around the button 10. If the body 1 of the instrument is parallel with the level floor the cord will lie naturally in the slots 8 and 9. Under these conditions it is known that the body of the instrument is parallel to the plane of the floor or other support, and therefore when the straight edge is applied to the wheel 46, its angular position as indicated by the position of the part 22 on the scale 18, will give an accurate reading of the wheel camber.

In Fig. 7 there is depicted a situation where the floor is not level. The floor line slants downwardly toward the right with the result that there is a low spot at the point $x$ underlying the wheel 46. The floor line need not be straight between the two wheels, the essence being to represent a situation where one wheel is lower than the other. To the right of the point $x$ the floor inclines upwardly as indicated by the line $y$ and it is on this portion of the floor that the instrument rests. The target is placed against the wheel 45 as above described and then the instrument is applied with its straight edge on the wheel 46. When the cord is drawn taut as above set forth it is passed through the slot 9, but it will be observed that the cord passes above the slot 8. Therefore, the instrument is not properly aligned in a plane paralleling a plane which in itself is parallel to a plane connecting the two supporting points for the wheels. To adjust the instrument the screw 5 is turned to lower the outer end of the body and when the slot 9 comes into alignment with a plane through the point 41 and the slot 8 the taut cord snaps into the slot 8 and the instrument is then in proper adjustment. There may be numerous floor conditions other than the one represented above where this adjustment is to be made. Sometimes the outer end of the body may be lower than the plane through the point 41 and slot 8, in which event the screw 5 is turned to elevate the outer end of the body thus to raise the cord where it passes through the slot 9 until the cord comes into alignment and passes into the slot 8. However, the one example shown in Fig. 7 is believed to demonstrate the performance and functions of the instrument.

In the checking of the caster the level 35 comes into use. The caster of a wheel is usually checked in the following manner: A wheel, such as the wheel 46 (Fig. 8) is turned inwardly, a determined amount such as 30° as illustrated, and a reading is then taken of the angular disposition of the wheel. Then the wheel is turned outwardly to the same extent, say 30°, and a second reading is taken of the angular disposition of the wheel. A proper computation of these readings will give the angularity of the king pin 48 known as caster.

The caster is obtained by the present instrument as follows: The wheel 46 is turned inwardly, say 30°, as shown in Fig. 8 and the straight edge applied to the wheel. The screw 5 is now adjusted to vary the angularity of the body until the reading on the scale 18 is zero. While the instrument is in this position the screw 39 is adjusted to bring the spirit level to a level or zero reading. This establishes a fixed starting condition with a zero reading on the scale and the zero reading on the level. The wheel is now turned outwardly, say 30°, as shown in Fig. 9 and the instrument is once more applied to the wheel as indicated. The relationship between the level and the body is to remain undisturbed. The screw 5 is now adjusted until the level 35 again reads zero, or in other words, is brought back to a true level condition. This has the effect of shifting the scale relative to the pointer 22 which remains in a position which is fixed by the application of the straight edge to the wheel. When the level 35 shows a zero reading the scale 18 then gives a reading of the caster.

It is to be understood that the instrument including its scale is constructed so that there preferably need be no computation after the scale readings are taken. In other words, the scale 18 is prearranged so that upon comparative checks, as made in Figs. 8 and 9, the actual caster in degrees is indicated. Likewise, the actual reading of the camber is indicated in degrees. In the drawings there is represented a manner of use of a tool in reading the camber and the caster of the wheel which is on the right side as the figures are viewed. However, it is believed that it is clear that the wheel on the opposite side, namely the wheel 45, may be similarly gauged.

We claim:

1. A gauge for checking the adjustment of a wheel comprising a body, a scale on the body, a straight edge for engaging a wheel, means pivotally mounting the straight edge on the body, an indicator connected with the straight edge and operable along the scale around the pivotal mounting, an adjustable support for the body for engaging a floor and which is adjustable to vary the angularity of the body relative to the floor, and a level instrument adjustably mounted on the body, said straight edge including two members, one of which is foldable to overlap the other and extendible to increase the length of the straight edge and means for locking the two members in alignment in extended position.

2. A gauging means for checking the camber of a vehicle wheel comprising a body, a scale on the body, a member for engaging the vehicle wheel, means pivotally mounting the member to the body, an indicator associated with said member and moveable over the scale, an adjustable support for varying the angularity of the body relative to the floor, means for attaching a cord to the body and a marker on the body for indicating alignment of the body with the cord when the cord is drawn taut and attached to a remote anchor.

3. A gauging means for checking the camber of a vehicle wheel comprising a body, a scale on the body, a member for engaging the vehicle wheel, means pivotally mounting the member to the body adjacent one end of the body, an indicating device moveable with said member relative to the scale for indicating wheel camber, an adjustable support for the end of the body opposite the pivotal mounting of the wheel engaging member for varying the angularity of the body relative to the floor, means for attaching a cord to the body which is adapted to be drawn taut and attached to a remote anchor and a marker on the body for cooperating with the cord to indicate when the body is adjusted to a position parallel to the cord.

4. A gauging means for checking the camber of a vehicle wheel comprising a body, a scale on the body, a member for engaging the vehicle wheel, means pivotally mounting the member to the body adjacent one end of the body, an indicating device moveable with said member relative to the scale for indicating wheel camber, an adjustable support for the end of the body opposite the pivotal mounting of the wheel engaging member for varying the angularity of the body relative to the floor, means for attaching a cord to the body adjacent the end having the adjustable support, said cord adapted to be drawn taut and secured to a remote anchor, a notch in the body adjacent the end with the adjustable support for receiving the cord to establish a definite relationship between the cord and the body at this point, a second notch adjacent the end of the body to which the said member is connected and adapted to engage the cord when the body is adjusted into parallel relationship with the cord.

5. A gauging means for checking the camber of a vehicle wheel comprising a body, a scale on the body, a wheel engaging member moveably mounted on the body and having an indicator operable along the scale, an adjustable support for varying the angularity of the body relative to the floor, an anchor member adapted to be remotely positioned relative to the body and adapted to have a cord attached thereto, means on the body adapted to have the cord attached thereto with the cord in a taut condition, and a marker on the body adapted to align with the cord when the body is adjusted into parallel relationship therewith.

6. A gauging means for checking the camber of a vehicle wheel comprising a body, a scale on the body, a wheel engaging member moveably mounted on the body and having an indicator operable along the scale, an adjustable support for varying the angularity of the body relative to the floor, an anchor member adapted to be remotely positioned relative to the body and adapted to have a cord attached thereto, means on the body adapted to have the cord attached thereto with the cord in a taut condition, a pair of notches in the body, one of which is adapted to have the cord passed therethrough, the other of which is adapted to receive the cord upon adjustment of the body into a position parallel with the cord.

7. A gauging means for checking the camber of a vehicle wheel comprising an elongated body, a scale on the body, a wheel engaging member, means pivotally mounting the member adjacent one end of the body, said one end being termed the first end, an indicator member operable with said member and moveable over the scale for indicating wheel camber, an adjustable support for the second end of the body, an anchor member adapted to be located on the side of the wheel opposite that of the body, and adapted to have a cord attached thereto, means for attaching the cord to the body adjacent its second end, a notch adjacent the second end of the body adapted to have the cord placed therein, and a notch adjacent the first end of the body adapted to receive the cord when the body is adjusted into a position parallel to the cord.

8. A gauging means for checking the camber of a vehicle wheel comprising an elongated body, a scale on the body, a wheel engaging member, means pivotally mounting the member adjacent one end of the body, said one end being termed the first end, an indicator member operable with said member and moveable over the scale for indicating wheel camber, an adjustable support for the second end of the body, an anchor member adapted to be anchored substantially at the location of the opposite vehicle wheel and adapted to have a cord attached thereto at a predetermined height from the floor, means for securing the cord to the body adjacent its second end and for holding the cord at a predetermined height relative to the body, and a marker adjacent the first end of the body for indicating when the body is adjusted to a position parallel to the cord.

9. A gauging means for checking the camber of a vehicle wheel comprising an elongated body, a scale on the body, a wheel engaging member, means pivotally mounting the member adjacent one end of the body, said one end being termed the first end, an indicator member operable with said member and moveable over the scale for indicating wheel camber, an adjustable support for the second end of the body, an anchor adapted to be anchored substantially at the location of the opposite vehicle wheel and adapted to have a cord attached thereto, means for attaching the cord to the body adjacent its second end, a notch adjacent the second end of the body for receiving the cord and holding the cord and body in a definite relationship, a second notch in the body adjacent its first end and adapted to receive the cord when the body is adjusted to a position parallel to the cord.

ROBERT M. GREENLEAF.
JOHN L. HUNT.